(12) United States Patent
Guajardo et al.

(10) Patent No.: US 11,962,829 B2
(45) Date of Patent: Apr. 16, 2024

(54) DEVICES, SYSTEMS, AND METHODS FOR RECEIVING BROADCAST CONTENT VIA AN AUTOMOTIVE PORT

(71) Applicant: DISH Wireless L.L.C., Englewood, CO (US)

(72) Inventors: Marcel Antonio Guajardo, Lakewood, CO (US); Jeffery Graham Romaniuk, Castle Rock, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 16/875,247

(22) Filed: May 15, 2020

(65) Prior Publication Data

US 2021/0360310 A1  Nov. 18, 2021

(51) Int. Cl.
*H04N 21/414*  (2011.01)
*H04N 21/433*  (2011.01)
*H04N 21/4363*  (2011.01)
*H04N 21/438*  (2011.01)
*H04N 21/61*  (2011.01)

(52) U.S. Cl.
CPC ..... *H04N 21/41422* (2013.01); *H04N 21/433* (2013.01); *H04N 21/43637* (2013.01); *H04N 21/4383* (2013.01); *H04N 21/6131* (2013.01)

(58) Field of Classification Search
None
See application file for complete search history.

(56) References Cited

U.S. PATENT DOCUMENTS

| | | | | |
|---|---|---|---|---|
| 2004/0068350 | A1* | 4/2004 | Tomson | G01C 21/36 701/1 |
| 2004/0109287 | A1* | 6/2004 | Yang | G06F 1/1601 361/679.29 |
| 2005/0060072 | A1* | 3/2005 | Harumoto | H04H 60/72 307/10.1 |
| 2005/0148376 | A1* | 7/2005 | Kucera | A63F 13/00 463/1 |
| 2006/0075436 | A1* | 4/2006 | Schedivy | H04N 21/41422 725/75 |

(Continued)

OTHER PUBLICATIONS

International Search Report and Written Opinion for International Application No. PCT/US2021/032323, dated Aug. 11, 2021, 19 pages.

(Continued)

*Primary Examiner* — Alexander Q Huerta
(74) *Attorney, Agent, or Firm* — Jeremiah J. Baunach; VLP Law Group (57) ABSTRACT

Embodiments of a device that includes an automotive-specific connector are described herein. The device includes radiofrequency (RF) communication circuitry communicatively coupled to processing circuitry and configured to receive a broadcast digital television signal. The processing circuitry configured to receive a user selection of broadcast digital television content to be obtained. The RF communication circuitry controlled to select a frequency band corresponding to the broadcast digital television content from the broadcast digital television signal. Encoded broadcast digital content is received from the RF communication circuitry and a digital bitstream is decoded to obtain the selected broadcast digital television content therein.

20 Claims, 6 Drawing Sheets

(56) References Cited

U.S. PATENT DOCUMENTS

| | | | | |
|---|---|---|---|---|
| 2014/0095014 | A1* | 4/2014 | Rude | G07C 5/008 |
| | | | | 709/217 |
| 2015/0100983 | A1* | 4/2015 | Pan | H04N 21/4222 |
| | | | | 725/39 |
| 2016/0353152 | A1* | 12/2016 | Majid | H04N 5/50 |
| 2017/0015260 | A1* | 1/2017 | Mack | G02B 27/017 |
| 2017/0026684 | A1* | 1/2017 | Shan | H04N 21/8455 |
| 2018/0077450 | A1* | 3/2018 | Stewart | H04N 21/43637 |
| 2018/0167670 | A1* | 6/2018 | Sprenger | H04N 21/43615 |
| 2018/0181360 | A1* | 6/2018 | Cansino | H04N 21/41265 |
| 2018/0359298 | A1 | 12/2018 | Grimm et al. | |
| 2021/0360310 | A1* | 11/2021 | Guajardo | H04N 21/458 |

OTHER PUBLICATIONS

Anonymous: "In-Car TV Tuner Digital (DVB-T) TV Tuner for BMW IBUS," MCA-DVBT-TV-01 User Manual, Jan. 1, 2014, pp. 1-16.

Anonymous: "Dual Diversity DVB-T2 TV Receiver," GEX-2850DVB2, Pioneer Operation Manual, Jan. 1, 2015, pp. 1-23.

International Preliminary Report on Patentability received for PCT Patent Application No. PCT/US2021/032323, dated Nov. 24, 2022, 11 pages.

* cited by examiner

DEVICES, SYSTEMS, AND METHODS FOR RECEIVING BROADCAST CONTENT VIA AN AUTOMOTIVE PORT

BACKGROUND

Technical Field

The present disclosure relates to television tuner devices.

Description of the Related Art

Vehicles may be equipped with or be modified to include one or more display devices in the vehicle interior. Users may sometimes wish to view television content from a local broadcast network while traveling as a passenger in a vehicle. Cellular communication networks may enable users to access and stream some television content from the local broadcast network; however, accessing such content via cellular data networks reduces the available bandwidth of the cellular data network. Moreover, some television content of the local broadcast network may not be accessible from an online platform.

BRIEF SUMMARY

Briefly stated, embodiments of the present disclosure may be characterized as including a device that includes a housing. The device also includes an automotive-specific connector positioned on the housing, the automotive-specific connector configured for attachment to a port of a vehicle. The device also includes radiofrequency (RF) communication circuitry configured to receive an over-the-air broadcast digital television signal and select a frequency band from the broadcast digital television signal. The device also includes processing circuitry communicatively coupled with the RF communication circuitry and the automotive-specific connector. The processing circuitry is configured to receive a user selection of broadcast digital television content to be obtained; control the RF communication circuitry to select the frequency band corresponding to the broadcast digital television content from the broadcast digital television signal; receive encoded broadcast digital content from the RF communication circuitry; and decode the digital bitstream to obtain the broadcast digital television content in response to the user selection. Other embodiments of this aspect include corresponding computer systems, apparatus, and computer programs recorded on one or more computer storage devices, each configured to perform the actions of the methods.

According to an embodiment, the automotive-specific connector is an on-board diagnostic connector of a vehicle. According to an embodiment, the broadcast digital television signal is a signal satisfying various Advanced Television Systems Committee (ATSC) standards, such as the ATSC 1.0 standard and the ATSC 3.0 standard. According to an embodiment, the processing circuitry is configured to transmit the broadcast digital television content to one or more electrical systems of the vehicle through the automotive-specific connector. The device may include memory communicatively coupled to the processing circuitry, the processing circuitry configured to store, at a first time, the broadcast digital television content in the memory in response to the user selection; receive, at a second time, a request for the broadcast digital television content; and transmit the broadcast digital television content in response to the request. The processing circuitry is configured to control the RF communication circuitry at the future time to select the frequency band. The user selection is received via the secure wireless communication connection. The processing circuitry includes one or more motion picture expert group (MPEG) decoders, the processing circuitry configured to decode the digital bitstream using an MPEG decoder of the one or more MPEG decoders. The device is configured to receive electrical power from the vehicle through the automotive-specific connector. The device may include a connector positioned on the housing and electrically coupled with the RF communication circuitry, the connector configured for connection of an RF antenna, the RF communication circuitry configured to receive the broadcast digital television signal through the connector. According to an embodiment, the device includes cellular communication circuitry communicatively coupled with the processing circuitry, the cellular communication circuitry configured to communicate cellular data with one or more cellular communication systems. The user selection is received through the automotive-specific connector. Implementations of the described techniques may include hardware, a method or process, or computer software on a computer-accessible medium.

One or more embodiments may include a method comprising receiving, by a device having an automotive-specific connector coupled to a port of a vehicle, a user selection of broadcast digital television content to be obtained. The method also includes receiving, by radiofrequency RF communication circuitry of the device, an over-the-air broadcast digital television signal; selecting, by the RF communication circuitry, a frequency band corresponding to the broadcast digital television content from the broadcast digital television signal; receiving encoded broadcast digital content from the RF communication circuitry; and decoding the digital bitstream to obtain the broadcast digital television content in response to the user selection. Other embodiments of this aspect include corresponding computer systems, apparatus, and computer programs recorded on one or more computer storage devices, each configured to perform the actions of the methods.

According to an embodiment, the method includes transmitting the broadcast digital television content to one or more electrical systems of the vehicle through the automotive-specific connector. According to an embodiment, the method includes storing, at a first time, the broadcast digital television content in the memory in response to the user selection; receiving, at a second time, a request for the broadcast digital television content; and transmitting the broadcast digital television content in response to the request. The user selection may be received via the secure wireless communication connection. Implementations of the described techniques may include hardware, a method or process, or computer software on a computer-accessible medium.

One or more embodiments described herein include a system comprising an RF antenna sized and shaped for receiving an over-the-air broadcast digital television signal; RF communication circuitry configured to select a frequency band from the broadcast digital television signal; a first device that includes a housing; an automotive-specific connector positioned on the housing, the automotive-specific connector configured for attachment to a port of a vehicle; and processing circuitry communicatively coupled with the RF communication circuitry and the automotive-specific connector. According to an embodiment, the processing circuitry is configured to receive a user selection of broadcast digital television content to be obtained; control the RF communication circuitry to select the frequency band corresponding to the broadcast digital television content from the broadcast digital television signal; receive encoded broadcast digital content obtained by the RF communication circuitry; and decode the digital bitstream to obtain the broadcast digital television content in response to the user selection. Other embodiments of this aspect include corresponding computer systems, apparatus, and computer programs recorded on one or more computer storage devices, each configured to perform the actions of the methods.

According to an embodiment, the system where the first device includes the RF communication circuitry and further includes a port electrically coupled to the RF communication circuitry, the port configured for connection of the RF antenna.

According to an embodiment, the system includes a second device that includes the RF antenna and the RF communication circuitry. The second device includes second wireless communication circuitry communicatively coupled with the RF communication circuitry, the first wireless communication circuitry configured to establish a secure wireless communication connection with the second wireless communication circuitry. According to an embodiment, the second wireless communication circuitry is configured to transmit the digital bitstream received from the RF communication circuitry over the secure wireless communication connection. Implementations of the described techniques may include hardware, a method or process, or computer software on a computer-accessible medium.

Other features are disclosed herein and the foregoing section is understood to be a non-limiting summary of the scope of the present disclosure.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
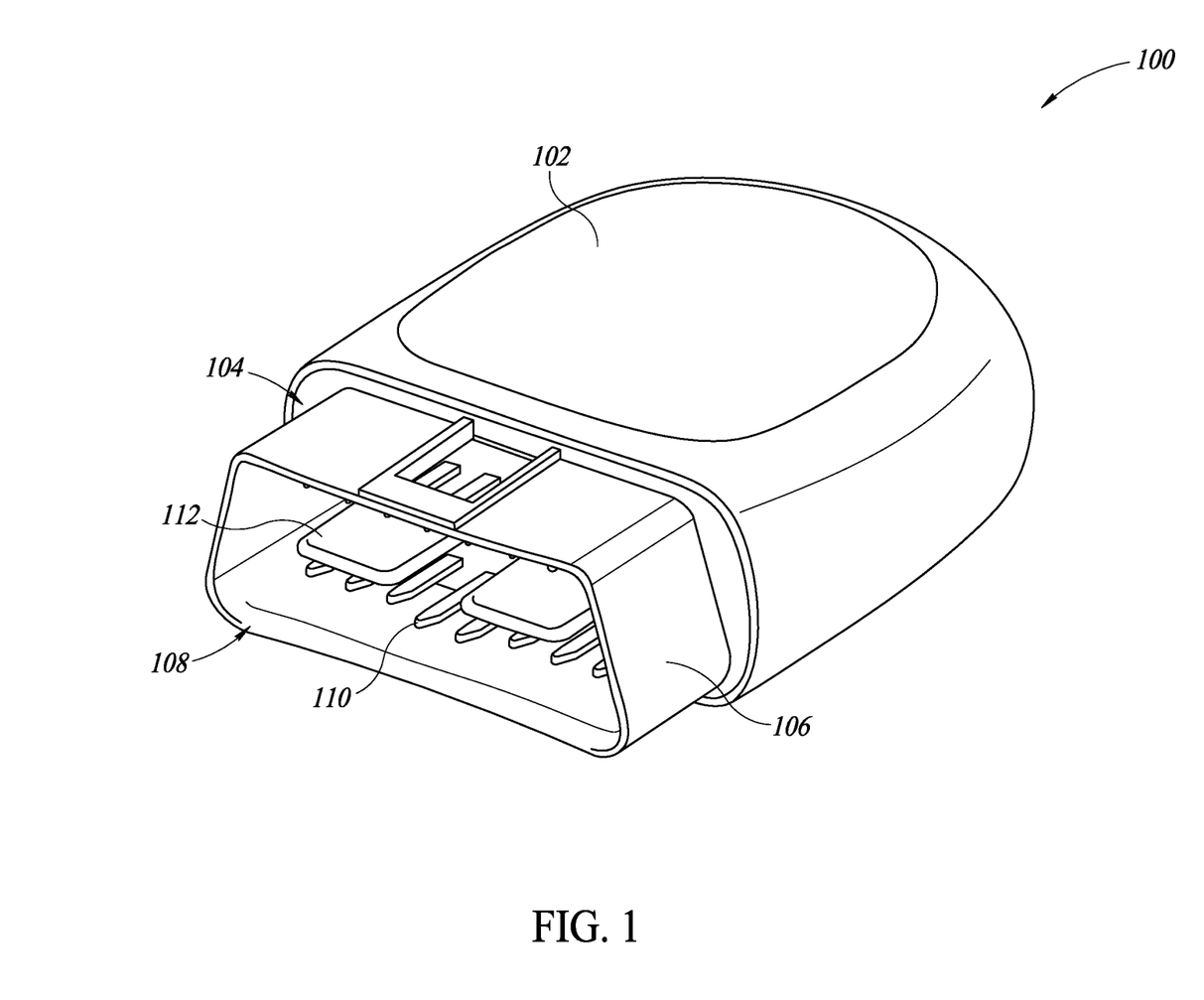
FIG. 1 is a content communication device according to one or more embodiments.

FIG. 1 shows a content communication device 100 according to one or more embodiments. The content communication device 100 is configured to be physically and electrically coupled to an automotive-specific port of a motor vehicle, such as a car or truck. When coupled to the automotive-specific port of the vehicle, the content communication device 100 is configured to receive an over-the-air broadcast signal transmitted by a broadcast content provider, such as a broadcast television station. The content communication device 100 processes the broadcast signal to obtain decoded data content. The content communication device 100 provides the decoded data content to one or more electrical systems of the vehicle via the automotive-specific port. The content communication device 100 may also be configured to, when coupled to the automotive-specific port, facilitate communications between one or more devices in the vehicle and a cellular communication network.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

Referring back to FIG. 1, the content communication device 100 has a housing 102 and a connector 104 provided on the housing 102. The housing 102, in at least some embodiments, has a form factor sized to be held in a hand and may be formed of a rigid material, such as plastic or metal. The connector 104 is an automotive-specific connector configured to physically coupling the content communication device 100 to a corresponding port or socket of a motor vehicle. In some embodiments, the connector 104 is sized and shaped to connect to an on-board diagnostic port of a motor vehicle satisfying a set of recognized standards for diagnostics connectors and testing. Non-limiting examples of such ports include standards established by the Society of Automotive Engineers (SAE), such as SAE J1962, SAE J1850, SAE J1939, SAE J2178, SAE J2284, and SAE J2411; or standards established by the International Organization for Standardization (ISO), such as ISO 15031, ISO 15765, and ISO 27145. Specific examples of such ports include On-Board Diagnostics (OBD) ports (e.g., OBD-II ports), European OBD ports (EOBD2), Japanese OBD ports (JOBD), and Australian Design Rule 79/01 ports (ADR 79/01 ports).

The connector 104 in the embodiment shown has D-shaped sidewalls 106 extending from the housing 102 and defining a cavity 108 for receiving a corresponding male connector of the diagnostic port of the vehicle. The connector 104 also includes a plurality of electrically conductive pins 110 extending from the housing 102 in the cavity 108 for electrically coupling circuitry of the content communication device 100 with the one or more electrical systems of the vehicle. The connector 104 also includes one or more projecting portions 112 for engaging with one or more corresponding receptacles on the automotive port. The pins 110 in the embodiment shown are arranged in an upper first row and a lower second row separated by the one or more projecting portions 112. Each of the pins 110 has a corresponding electrical signal associated therewith, such as communication signals and power signals.

Figure 2:
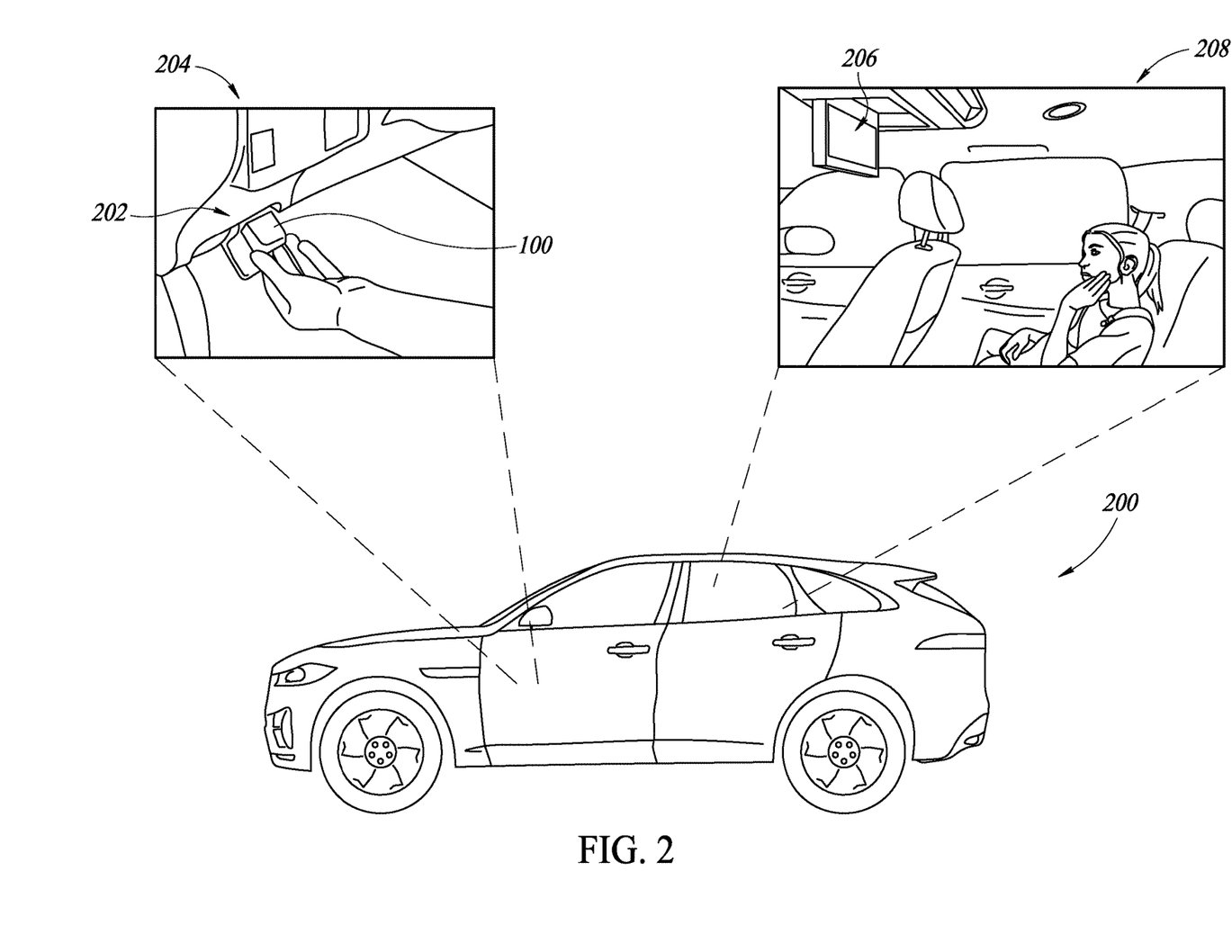
FIG. 2 is the content communication device of FIG. 1 connected to a port of a vehicle according to one or more embodiments.

FIG. 2 shows a vehicle 200 in which the content communication device 100 can be selectively installed according to one or more embodiments. The vehicle includes a diagnostic port 202 configured for engaging with a connector of a device, such as the connector 104 of the content communication device 100. The diagnostic port 202 shown is located in or adjacent to a driver side footwell 204 of the vehicle 200, but may be located in other parts of the vehicle 200, such as a rear storage compartment (e.g., trunk), passenger side footwell, center storage console, glove compartment, in an engine compartment, or elsewhere depending on the configuration of the vehicle 200. The vehicle 200 may include a number of other types of ports that are different than and distinguishable from the diagnostic port 202. For example, the vehicle 200 may include a universal serial bus (USB) port, an audio jack, a High Definition Media Interface (HDMI) port, or any number of ports that are distinguishable from the diagnostic port 202. The vehicle 200 may include an antenna configured to receive over-the-air broadcast digital television signals that satisfy various ATSC standards described herein, such as ATSC 1.0, ATSC 3.0, or both. In some embodiments, the antenna may be installed as part of the manufacturing process of the vehicle 200. In some embodiments, the antenna may be installed as an aftermarket addition.

The diagnostic port 202 includes a number of receptacles or other connector elements for engaging with the pins 110. Each of the pins 110 and corresponding receptacles are dedicated for a particular signal. The pins 110 may include one or more pins for receiving direct current (DC) power from a battery of the vehicle 200, one or more pins for connecting to a ground of the vehicle 200 (e.g., chassis ground, signal ground), one or more pins for exchanging data according to one or more communication protocols, or one or more pins specific to the make and/or model of the vehicle 200. Examples of communication protocols that may be implemented for sending or receiving data via the pins 110 include serial data protocols, controller area network (CAN) protocols, Inter-Integrated Circuit (I²C) protocols (e.g., enhanced display data channel protocol), and the AV.link communication protocol, by way of non-limiting example.

The content communication device 100 is configured, at least in part, to provide media content to the connector 104 based on a result of processing a broadcast digital television signal received by the content communication device 100. When the content communication device 100 is coupled to the diagnostic port 202, the content communication device 100 may receive and process a broadcast digital television signal to obtain audiovisual media content. The content communication device 100 may transmit the audiovisual media content to one or more electrical systems of the vehicle 200 via the connector 104. As an example, the audiovisual media content may be transmitted via the connector 104 to one or more displays 206 in an interior 208 of the vehicle 200. In some embodiments, some of content in the broadcast digital television signal received and processed by the content communication device 100 may include data content that is not audiovisual in nature, as described herein.

Figure 3:
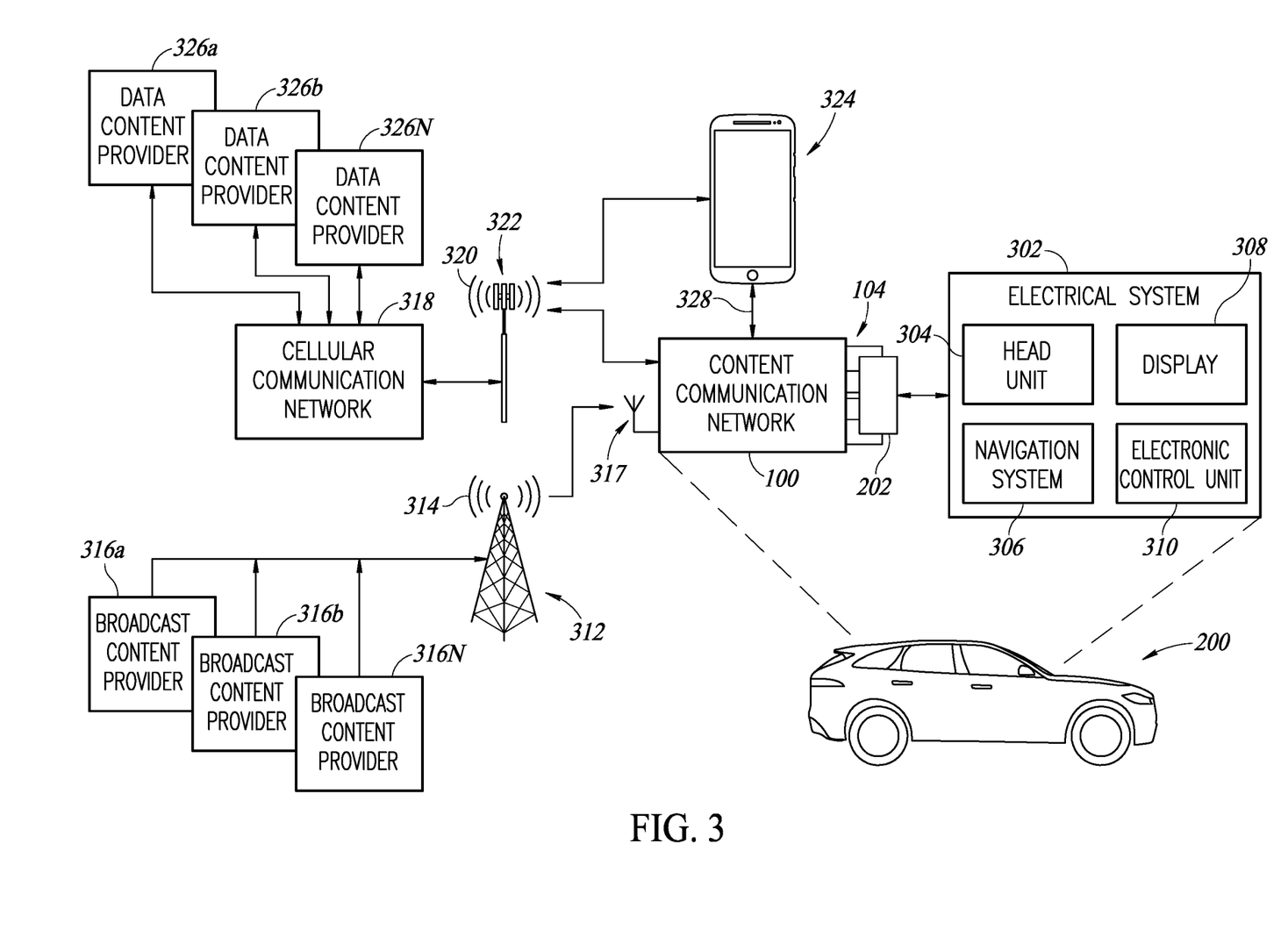
FIG. 3 is an environment in which the vehicle installed with the content communication device 100 operates.

FIG. 3 shows an environment 300 in which the content communication device 100 is provided to receive and process a broadcast digital television signal according to one or more embodiments. In the environment 300, the content communication device 100 is installed in the vehicle 200 via connection of the connector 104 with the port 202. As a result, the content communication device 100 is electrically and communicatively coupled with one or more electrical systems 302 of the vehicle 200. The electrical systems 302 to which the content communication device 100 may be coupled via the port 202 include a head unit 304 of the vehicle 200 (e.g., center console display), a navigation system 306, one or more display units 308, an over-the-air antenna 317, and an electronic control unit (ECU) 310. The antenna 317 is configured to receive over-the-air broadcast digital television signals that satisfy ATSC 1.0 standards, ATSC 3.0 standards, or both.

The environment 300 also includes a broadcast television system 312 that includes a broadcast transmitter that transmits a broadcast digital television signal 314 to a geographic area. The term, "broadcast digital television signal," used herein refers to an over-the-air signal that includes encoded video data transmitted to a geographic region from a broadcast transmitter. Broadcast digital television signals are transmitted according to one or more standards, such as the Advanced Television System Committee (ATSC) standards in some territories, such as the United States. However, other territories have similar standards, such as the Digital Video Broadcasting-Terrestrial (DVB-T) standard implemented in regions of Europe and Asia, the Integrated Services Digital Broadcasting-Terrestrial (ISDB-T) standard implemented in regions of South America, the Digital Terrestrial Multimedia Broadcast (DTMB) standard implemented in China, as well as other standards in certain regions. The broadcast digital television signal 314 may be transmitted using Orthogonal Frequency-Division Multiplexing (OFDM) techniques. The broadcast digital television signal 314 may have a transmission band or radiofrequency (RF) spectrum between 54 megahertz (MHz) and 860 MHz; however, the RF spectrum may be different in some implementations (e.g., between 54 MHz and 598 MHz).

As a particular example, the broadcast digital television signal 314 transmitted may satisfy one or more ATSC standards, such as the ATSC 1.0 standard or the ATSC 3.0 standard. The broadcast digital television signal 314 may support data transmission rates of 56 megabits per second (Mbps), High Efficiency Video Coding (HEVC) video encoding, and Dolby AC-4 or MPEG-H audio encoding. The broadcast digital television signal 314 may be modulated using an 8-level vestigial sideband modulation (8VSB) method.

The broadcast television system 312 broadcasts content provided by a set of broadcast content providers 316a, 316b, . . . , 316N (collectively "broadcast content providers"). The broadcast content providers 316 may include local networks, regional networks, or national networks. Each broadcast content provider 316 is allocated one or more frequency bands or "channels" within the RF spectrum of the broadcast digital television signal 314. In some instances, a given region may receive a plurality of broadcast digital television signals 314 from a plurality of broadcast television systems 312, each broadcast digital television signal 314 encoding content from one or more broadcast content providers 316.

The environment 300 also includes one or more cellular communication networks 318 that transmit and receive cellular data signals 320 via one or more cellular communication antennas 322. The cellular communication antennas 322 communicate with a set of mobile devices 324 (e.g., smartphones) within various geographic areas. The cellular communication networks 318 facilitate communication between the mobile device 324 and a plurality of data content providers 326a, 326b, . . . , 326N (collectively data content providers 326). The data content providers 326 include websites, applications, cloud services, and the like.

The content communication device 100 is configured to receive the broadcast digital television signal 314 and process the broadcast digital television signal 314 to obtain digital television content encoded therein. The content communication device 100 is configured to transmit the digital television content obtained to one or more electoral systems 302 of the vehicle 200 via the connection between the connector 104 and the port 202. The content communication device 100 may also be configured to send cellular communication signals 320 to and receive cellular communication signals 320 from the cellular communication network 318 via one or more solar communication antennas 322. The cellular communication network 318 is configured to transmit and receive the cellular communication signals 320 according to one or more telecommunication standards, such as the 4G, 4GLTE, or 5G telecommunication standards.

The content communication device 100 may also communicate with one or more mobile devices 324 proximate to the vehicle 200 to control various aspects of the content communication device 100. For instance, the content communication device 100 and the mobile device 324 may establish a secure wireless communication connection 328 through which the content communication device 100 may be controlled to obtain selected content from the broadcast television system 312, as described herein. In some embodiments, the content communication device 100 may be controlled to obtain selected content from the broadcast television system 312 using a remote control device specifically configured for controlling the content communication device 100.

In some embodiments, one or more frequency bands in the broadcast digital television signal 314 may encode executable application instructions for implementing applications, widgets, games, and other such computer-executable instructions. The broadcast television system 312 may transmit the application instructions at defined times (e.g., periodically, at a certain time of the day or week) in the one or more frequency bands of the broadcast digital television signal 314. The content communication device 100 may be controlled by a user to automatically receive and decode the application instructions at the defined times, and store the application instructions in memory. The stored instructions, as a result of execution, cause the content communication device 100 to present the applications, widgets, games, etc., on one or more of the electrical systems 302 (e.g., the display(s) 308).

In some embodiments, one or more frequency bands in the broadcast digital television signal 314 may encode video data content from one or more of the data content providers 326. The broadcast television system 312 may transmit the video data content at defined times in the one or more frequency bands of the broadcast digital television signal 314. The content communication device 100 may be controlled by a user to automatically receive and decode the video data at the defined times, and store the video data in memory. For instance, the user may select categories of videos, specific popular shows, or channels that the user is interested in, which the content communication device 100 will automatically store for offline playback. A user can then selectively access the stored video data at a later time and watch the video via offline playback.

Transmitting data content from the data content providers 326 by the broadcast television system 312 can help to expand signal coverage due to the more powerful broadcast digital television signal 314. Transmitting data content from the data content providers 326 by the broadcast television system 312 can also help to increase the available data bandwidth of the cellular communication network 318 by offloading some data content onto the broadcast television system 312. Transmitting application instructions can also help to promote or advertise certain applications, games, etc., to which a user may not otherwise be exposed.

Figure 4:
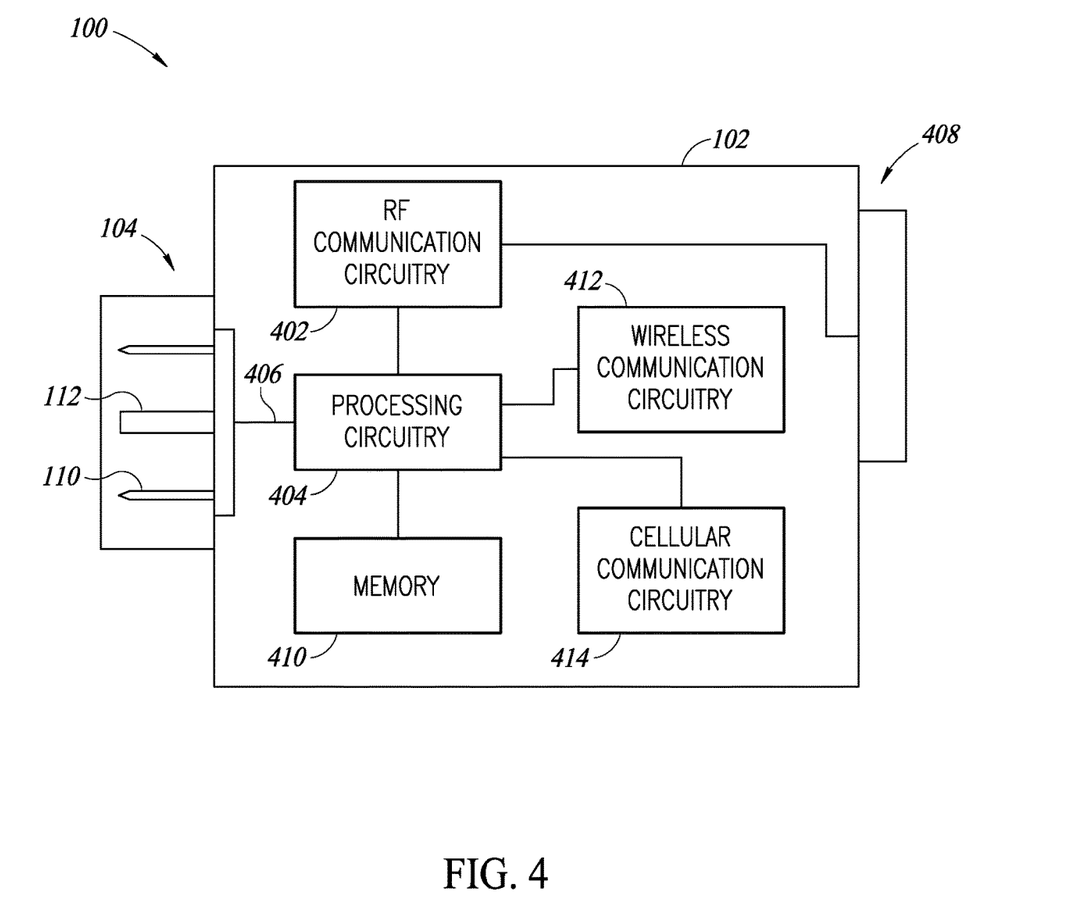
FIG. 4 is a first schematic diagram of the content communication device according to one or more embodiments.

FIG. 4 shows a schematic view of the content communication device 100 according to one or more embodiments. Various features of the content communication device 100 are substantially similar to features of the content communication device 100 discussed elsewhere herein, so further description thereof is omitted for brevity. The content communication device 100 includes RF communication circuitry 402 and processing circuitry 404 for receiving and processing the broadcast digital television signal 314. In particular, the RF communication circuitry 402 includes tuning circuitry for the broadcast digital television signal 314 to obtain a desired signal in a selected frequency band or channel therein. The tuning circuitry may include a mixer, frequency filters (e.g., low-pass filters), analog-to-digital converters (ADCs), and digital signal processors for performing appropriate operations involving the broadcast digital television signal 314 (e.g., a Fourier Frequency Transform of a digital signal obtained from an ADC). The RF communication circuitry 402 includes a demodulator for demodulating a modulated signal in the selected frequency band and may include a demultiplexer for demultiplexing the demodulated signal to obtain a digital bitstream of encoded data content. Some of all of the RF communication circuitry 402 may be embodied as an integrated circuit, such as a silicon tuner.

The digital bitstream may include data content that is encoded according to a standard format, such as a format established by the Moving Pictures Experts Group (MPEG). The digital bitstream may include video data encoded according to HEVC or MPEG-4 Advanced Video Compression techniques, and may include audio data encoded according to Dolby AC-3, Dolby AC-4, or MPEG-H 3D Audio techniques. The digital bitstream may also include metadata (e.g., Program and System Information Protocol data) associated with the encoded data, such as a description of the content (e.g., title, episode number, episode summary, rating, length) and channel information.

The processing circuitry 404 processes the digital bitstream to obtain decoded data content. The processing circuitry 404, in particular, includes one or more codecs for decoding the digital bitstream received from the RF communication circuitry 402. The one or more codecs may include s configured to receive and decode the digital bitstream using one or more codecs. Such codecs may be implemented in the processing circuitry 404 using hardware (e.g., application-specific integrated circuits (ASICs), field-programmable gate arrays (FPGAs), complex programmable logic devices (CPLDs)), software (e.g., as code stored in memory or firmware), or both.

The digital bitstream may include supplemental data unrelated to the audio or video data. Such supplemental data may be generally applicable to the broadcast region of the broadcast television system 312, such as weather information, traffic information, construction information, news information, etc., that may be relevant. Such supplemental information may be provided in the digital bitstream in a standard format—for example, according to the ATSC Data Broadcast Standard, ATSC-M/H standard, or the Program and System Information Protocol.

The processing circuitry 404 is electrically coupled to the connector 104 for transmitting audiovisual data to the one or more electrical systems 302 of the vehicle 200. The content communication device 100, in particular, includes a plurality of electrical connections 406 between the processing circuitry 404 and the pins 110 of the connector 104. When the content communication device 100 is connected to the port 202, one or more of the pins 110 receive DC power for powering the content communication device 100. The content communication device 100 includes power electronic circuitry (not shown) configured to convert the DC power received into one or more DC power outputs that have a magnitude useable to power the components of the device, including the RF communication circuitry 402, the processing circuitry 404, and other components and circuitry described herein.

The electrical connections 406 provide connections between the processing circuitry 404 and corresponding ones of the pins 110 to communicate with the one or more electrical systems 302 using various communication protocols, such as serial communication protocols, CAN protocols, and the I²C protocol. The processing circuitry 404 also transmits processed media content to one or more of the electrical systems 302 for display on the display(s) 308. The electrical connections 406 may include one or more selection elements, such as multiplexers or demultiplexers, that are selectively controllable by the processing circuitry 404 to route processed data from the processing circuitry 404 to appropriate ones of the pins 110, which may be appropriate to account for different pinout configurations implemented for different makes and models of the vehicle 200.

The content communication device 100, in some embodiments, includes a second connector 408 electrically coupled to the RF communication circuitry 402. The second connector 408 is configured for connection of an antenna for receiving the broadcast digital television signal 314, as described below with respect to FIG. 5.

The content communication device 100 also includes memory 410 communicatively coupled to the processing circuitry 404 and stores instructions that, as a result of execution, causes the processing circuitry 404 to perform various operations described herein. The instructions stored in the memory 410 may include instructions for decoding a digital bitstream received by the processing circuitry 404 from the RF communication circuitry 402 using one or more audio codecs or one or more video codecs, as described herein. The memory 410 may include non-volatile computer-readable media, such as read only memory (ROM), solid state drives, hard disk drives, optical disc drives, and erasable programmable read-only memory, by way of non-limiting example. The memory 410 may include volatile computer-readable media, such as random access memory (RAM). In some cases, a particular memory is separated virtually or physically into separate areas, such as a first memory, a second memory, a third memory, etc. In these cases, it is understood that the different divisions of memory may be in different devices or embodied in a single memory.

The instructions stored in the memory 410 may include instructions for executing an operating system on the processing circuitry 404 and instructions for executing one or more applications on the operating system. The instructions may cause the processing circuitry 404 to generate visual content data for transmitting to the one or more electrical systems 302 via the connector 104 to cause the display(s) 308 to present a menu for user selection of a channel in the broadcast digital television signal 314 to be displayed. The processing circuitry 404 may receive a user selection of the channel to be displayed, for example, via a signal transmitted to the content communication device 100 through the connector 104. The processing circuitry 404 may control the RF communication circuitry 402 to provide a digital bitstream of the selected channel or frequency band in the broadcast digital television signal 314. The processing circuitry 404 decodes the digital bitstream received from the RF communication circuitry 404 and transmits the resulting media content to the one or more electrical systems 302. In some embodiments, the processing circuitry 404 transmits the decoded media content to the one or more electrical systems 302 via the connector 104. The decoded media content may be in the form of video data or a digital video signal (e.g., using transition minimized differential signaling techniques).

The processing circuitry 404 may receive, via user interaction with the menu, a user selection to receive and record certain content transmitted by the broadcast television system 312. The user selection may indicate a title or episode of a show, a sports team, or category of interest to be received and recorded when such content is broadcast by the broadcast television system 312. In some instances, the user selection may indicate an application (e.g., video game, social media) or online content provided by one of the data content providers 326 to be received and stored on the memory 410 when such content is broadcast by the broadcast television system 312.

The broadcast digital television signal 314 may include scheduling information specifying times periods at which media content will be broadcast for each day. The processing circuitry 404 may decode the broadcast digital television signal 314 and obtain the scheduling information from the decoded digital bitstream. The processing circuitry 4040 may use the scheduling information to identify the content to be recorded or stored using metadata encoded in the broadcast digital television signal 314. The processing circuitry 404 may control the RF communication circuitry 402 to select the channel of the broadcast digital television signal 314 at a particular time indicated in the scheduling information or based on a scan of the available content in the broadcast digital television signal 314. The processing circuitry 404 then decodes the digital bitstream provided by the RF communication circuitry 402 and stores the resulting media content in the memory 410.

The processing circuitry 404 may receive, via user interaction with the menu, a user selection to present content stored on the memory 410. For instance, the user selection may request presentation of digital television content stored on the memory 410 that was previously transmitted by one of the broadcast content providers 316. In response to receiving the user selection, the processing circuitry 404 may obtain the media content recorded in the memory 410 and transmit the recorded media content to the one or more electrical systems 302. As another example, the user selection may be to execute an application, such as a video game, that was previously broadcast by the broadcast television system 312 and stored in the memory 410 by the content communication device 100. To fulfill the request, the processing circuitry 404 may obtain and execute instructions corresponding to the requested application in the memory 410 and exchange data (e.g., user interaction data, display data) with the one or more electrical systems 302 during gameplay by the user.

The content communication device 100 may also include wireless communication devices 412 that are configured to wirelessly communicate with one or more mobile devices 324 in the vehicle 200. The wireless communication circuitry 412 may, in some implementations, wirelessly communicate with one or more wireless communication enabled systems of the electrical systems 302 of the vehicle 200. The wireless communication circuitry 412 includes one or more wireless transceivers and one or more corresponding antennae. The wireless communication circuitry 412 is configured to establish the secure wireless communication connection 328 with one or more mobile devices 324 in the vehicle 200. Communication via the secure wireless communication connection 328 is according to one or more wireless communications protocol, such as Bluetooth communication protocol or Wi-Fi communication protocols.

The content communication device 100 may also include cellular network communication circuitry 414 configured to wirelessly communicate with the data content providers 326 over the cellular communication network 318. The cellular network communication circuitry 414 includes one or more wireless transceivers and one or more corresponding antennae for transmitting and receiving cellular data signals 320 to and from the one or more cellular communication antennas 322. The cellular network communication circuitry 414 may be operated in parallel with the wireless communication circuitry 412 to establish an adhoc network (e.g., a "mobile hotspot") for distributing the cellular network connection with a plurality of mobile devices 324 in the vehicle 200.

Figure 5:
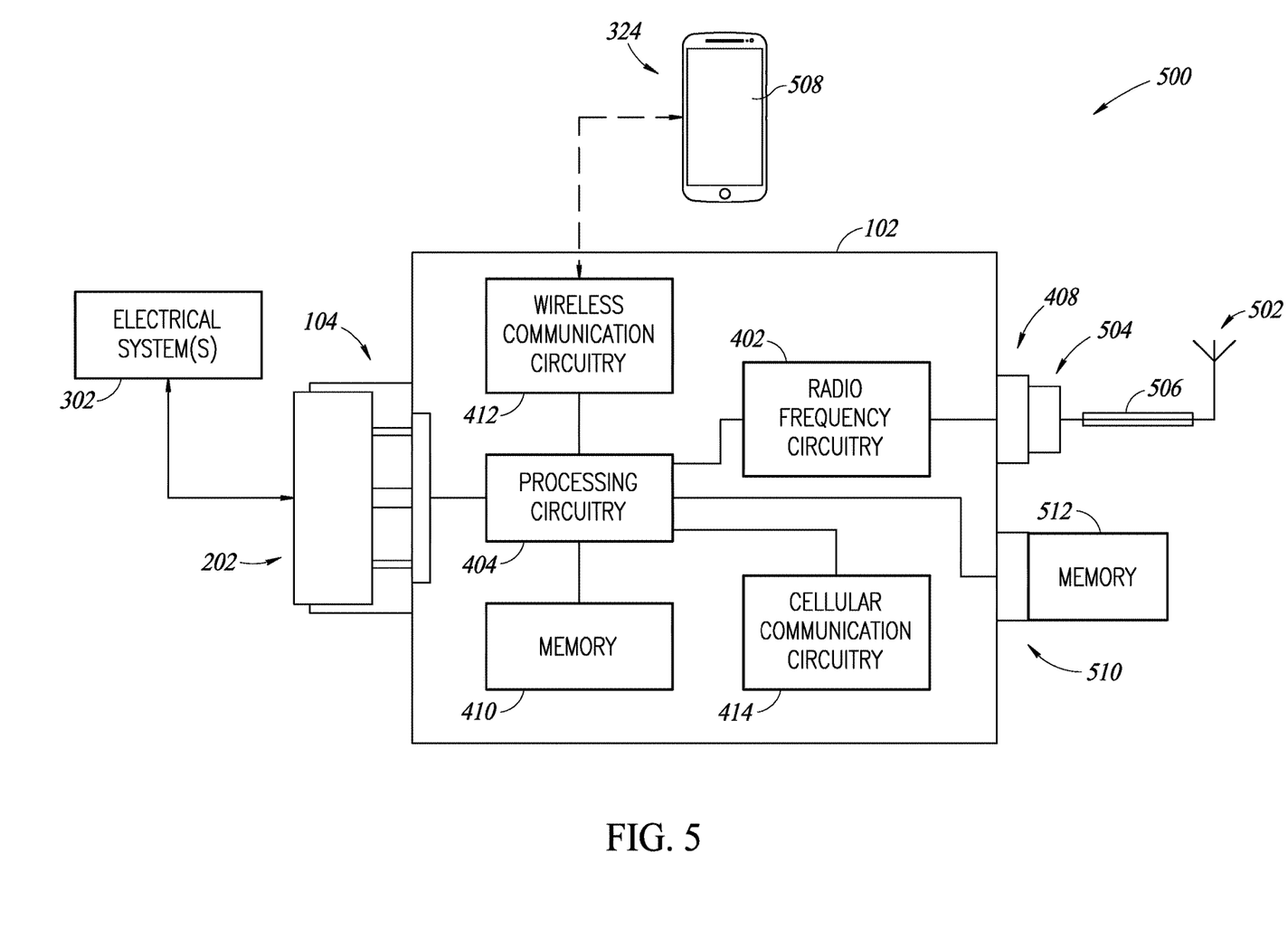
FIG. 5 is an environment in which the content communication device is operating according to one or more embodiments.

FIG. 5 shows an environment 500 in which the content communication device 100 is operating according to one or more embodiments. Various features of the content communication device 100 are substantially similar to features of the content communication device 100 discussed elsewhere herein, so further description thereof is omitted for brevity. The content communication device 100 is communicatively coupled to the one or more electrical systems 302 of the vehicle 200 via a connection between the connector 104 and the port 202. An antenna 502 is electrically coupled to the radiofrequency circuitry 402 via a connection between a connector 504 of the antenna 502 and the second connector 408 of the content communication device 100. The connector 504 and the second connector 408 may be any appropriate connectors for coupling radiofrequency signals into the content communication device 100.

The antenna 502 includes or has attached thereto a cable 506 for conveying the radiofrequency signal received from the antenna 502 to the connector 504. As a non-limiting example, the cable 506 may be a coaxial cable including a center conductor, shielding surrounding the center conductor, and a dielectric material separating the center conductor and the shielding. The antenna 502 is sized and shaped to receive radiofrequency signals in the 54 MHz to 860 MHz frequency range. The radiofrequency signals received by the antenna 502 are conveyed to the RF communication circuitry 402, which obtains a selected channel or frequency band from the broadcast digital television signal 314. In some embodiments, the antenna 502 may be integrated with the content communication device 100 such that the antenna 502 is not selectively attachable to and removable from the content communication device 100 via a connection between the second port 408 and the connector 504. For example, the cable 506 may have a length extending from the housing 102 or the antenna 502 may be integrated with or contained within the housing 102.

The processing circuitry 404 receives a user selection of the channel in the broadcast digital television signal 314 to be processed on the one or more electrical systems 302. In some embodiments, the processing circuitry 404 may transmit display data for displaying an on-screen menu via the connector 104 to one or more of the electrical systems 302, such as the display 308. The one or more electrical systems 302 may include one or more input devices, such as a touchscreen display, which may receive the user selection and transmit data indicating the user selection to the processing circuitry 404 through the port 202. The processing circuitry 404 may process the user selection and control the radiofrequency communication circuitry 402 to select the channel or frequency band indicated in the user selection.

In some embodiments, the user selection of the channel to be processed from the broadcast digital television signal 314 may be received via the secure wireless communication connection 328 between the mobile device 324 and the wireless communication circuitry 412. After establishing the secure wireless communication connection 328, a user may interact with an application 508 stored on the mobile device 324 to operate the content communication device 100. A user may select the channel to be processed in the application 508, which causes the mobile device 324 to transmit a user selection signal to the wireless can occasion circuitry 412 via the secure wireless communication connection 328. The application 508 may include a guide indicating content and times at which the content will be transmitted in the broadcast digital television signal 314. The user selection signal may specify a particular channel to be displayed on one or more of the electrical systems 302 or may specify information indicating a particular show, episode, movie, or other content of a particular channel to be recorded, or time information indicating a time period in which to record a particular channel of the broadcast digital television signal 314.

In some embodiments, the wireless communication circuitry 412 may be configured to transmit media content to the mobile device 324 from the processing circuitry 404. For example, the processing circuitry 4 4 may control the wireless can indication circuitry 412 to transmit video data over the secure wireless communication connection 328 to the mobile device 324 for display thereon.

Because the content communication device 100 is plugged into the port 202 which includes one or more receptacles electrically coupled to the battery of the vehicle 200, the content communication device 100 may be operated even when the vehicle 200 is not in operation. Therefore, the content communication device 100 can be controlled to receive and store content during times and days in which the user is not operating the vehicle 200. This also facilitates a reduction in bandwidth of the cellular communication systems 318 that may otherwise be used to download content.

The content communication device 100 may also include a third port 510 for insertion and removal of external memory 512, which includes non-volatile memory. The external memory 512, for example, may be a USB memory device or drive, or a secure digital (SD) memory card. The external memory 512 may be supplemental to the memory 410 and may be useful for providing software or firmware updates to the content communication device 100.

Figure 6:
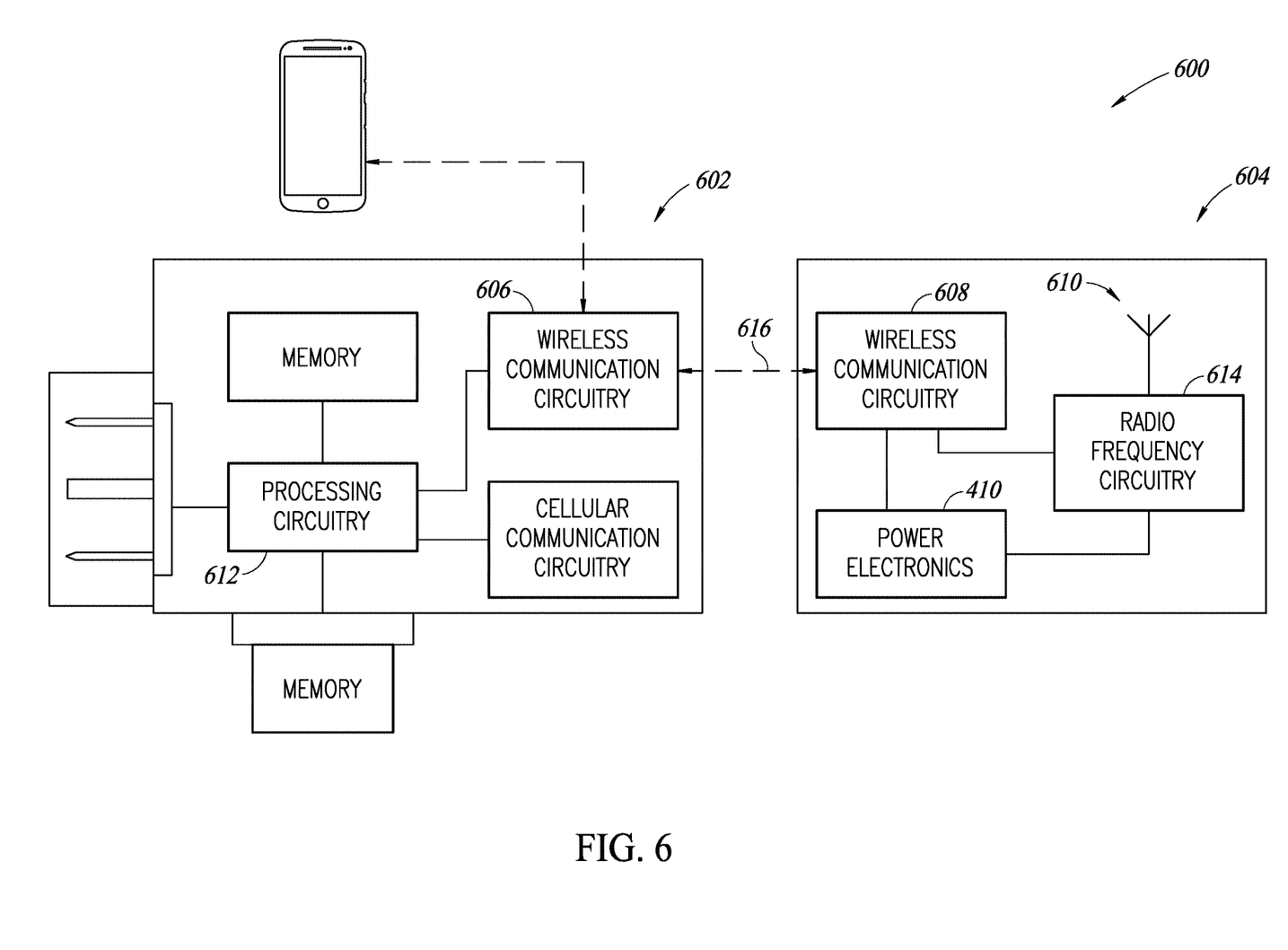
FIG. 6 is a second schematic diagram of the content communication device according to one or more embodiments.

FIG. 6 shows a system 600 that includes a first content communication device 602 and a second content communication device 604. Various features shown and described with respect to FIG. 6 are substantially similar to features described elsewhere herein, so further description thereof is omitted for brevity. The first content communication device 602 includes first wireless communication circuitry 606 that is configured to communicate with second wireless communication circuitry 608 in the second content communication device 604. The first content communication device 602 may be coupled to the port 202 of the vehicle 200 as described herein. The second content communication device 604 includes an antenna 610 and may be installed in the vehicle 200 in a separate location than the first content communication device 602. For instance, when the first content communication device 602 is installed in the port 202, e.g., in the driver side footwell, the antenna 610 may have a size and shape that does not conveniently fit in or adjacent to the footwell. Therefore, the second content communication device 604 can be installed elsewhere in the vehicle, such as under the back window or in the trunk. The first and second devices 602 and 604 may communicate with each other to obtain the desired broadcast digital television content.

The first content communication device 602 includes processing circuitry 612 that is substantially similar to the processing circuitry 404 of the content communication device 100. The processing circuitry 610 may receive a user selection regarding a channel to be processed from the broadcast digital television signal 314, as described herein. The processing circuitry 612 then controls the wireless communication circuitry 606 of the first content communication device 602 to transmit a request to the wireless communication circuitry 608 of the second content communication device 604 to obtain the desired broadcast digital television content from a selected channel of the broadcast digital television signal 314.

The second content communication device 604 includes RF communication circuitry 614, which the wireless communication circuitry 608 may control to select a channel of the broadcast digital television signal 314 and obtain a digital bitstream of the desired broadcast digital television content requested. The RF communication circuitry 614 is substantially similar to the RF communication circuitry 402. The RF communication circuitry 614 provides the digital bitstream of the selected channel of the broadcast digital television signal 314 to the wireless communication circuitry 608, which may transmit the digital bitstream of the selected channel to the wireless communication circuitry 606 of the first content communication device 602. A secure wireless communication connection 616 may be established between the wireless communication circuitry 606 and the wireless communication circuitry 608 according to one or more communication protocols—for example, using a W-Fi Direct protocol or Bluetooth protocol. The wireless communication circuitry 606 may then provide the digital bitstream to the processing circuitry 612, which decodes the digital bitstream to obtain decoded data, as described herein. The decoded data content, which may take the form of video data, or a digital television signal Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, or stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), and various combinations thereof.

The various embodiments described above can be combined or modified to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system in a vehicle, comprising:
   a first device that includes:
      a housing; and
      an automotive-specific connector positioned on the housing, wherein the automotive-specific connector is an on-board diagnostic connector configured for attachment to an on-board diagnostic port of the vehicle;
      first wireless communication circuitry;
      processing circuitry communicatively coupled with the automotive-specific connector; and
   a second device installed in a different location in the vehicle than the first device, wherein the second device includes:
      an RF antenna sized and shaped for receiving an over-the-air broadcast digital television signal;
      radiofrequency (RF) communication circuitry configured to select a frequency band from the broadcast digital television signal; and
      second wireless communication circuitry configured to transmit digital bitstreams received from the RF communication circuitry over a first secure wireless communication connection to the first wireless communication circuitry in the first device;

wherein the processing circuitry in the first device is configured to:
  receive, from a mobile device over a second secure wireless communication connection between the first device and the mobile device, a user selection of broadcast digital television content to be obtained;
  control the first wireless communication circuitry to transmit a request via the first secure wireless communication connection to the second device to control the RF communication circuitry in the second device to select the frequency band corresponding to the broadcast digital television content from the broadcast digital television signal;
  receive encoded broadcast digital content obtained by the RF communication circuitry in the second device via a digital bitstream over the first secure communication connection; and
  decode the digital bitstream to obtain the broadcast digital television content in response to the user selection.

2. The system of claim 1, wherein the first device further includes:
  a port electrically coupled to the RF communication circuitry, the port configured for connection of the RF antenna.

3. The system of claim 1, wherein the second device is installed under a back window of the vehicle or in a trunk of the vehicle.

4. The system of claim 1, wherein the broadcast digital television signal is an Advanced Television Systems Committee (ATSC) 1.0 signal or an ATSC 3.0 signal.

5. The system of claim 1, wherein the processing circuitry in the first device is configured to:
  transmit the broadcast digital television content to one or more electrical systems of the vehicle through the automotive-specific connector.

6. The system of claim 1, wherein the processing circuitry in the first device is configured to:
  store, at a first time, the broadcast digital television content in memory commutatively coupled to the processing circuitry in response to the user selection;
  receive, at a second time, a request for the broadcast digital television content; and
  transmit the broadcast digital television content in response to the request.

7. The system of claim 1, the processing circuitry in the first device configured to:
  obtain scheduling information indicating defined times at which media content will be encoded in the broadcast digital television signal; and
  determine, based on the scheduling information, a future time at which the broadcast digital television content will be encoded in the broadcast digital television signal, wherein the processing circuitry is configured to control the RF communication circuitry at the future time to select the frequency band.

8. The system of claim 1, comprising:
  wireless communication circuitry communicatively coupled with the processing circuitry in the first device, the wireless communication circuitry configured to establish a secure wireless communication connection between the wireless communication circuitry and one or more external electronic devices, wherein the user selection is received via the secure wireless communication connection.

9. The system of claim 1, wherein the processing circuitry in the first device includes one or more Motion Picture Expert Group (MPEG) decoders, the processing circuitry configured to decode the digital bitstream using an MPEG decoder of the one or more MPEG decoders.

10. The system of claim 1, wherein the first device is configured to receive electrical power from the vehicle through the automotive-specific connector.

11. The system of claim 1, comprising:
  cellular communication circuitry communicatively coupled with the processing circuitry, the cellular communication circuitry configured to communicate cellular data with one or more cellular communication systems.

12. The system of claim 1, wherein the user selection is received through the automotive-specific connector.

13. A method performed in a vehicle including a first device and a second device installed in a different location in the vehicle from the first device, wherein the first device includes an automotive-specific on-board diagnostic connector positioned on a housing and configured for attachment to an on-board diagnostic port of the vehicle, first wireless communication circuitry, processing circuitry communicatively coupled with the automotive-specific connector, wherein the second include an RF antenna sized and shaped for receiving an over-the-air broadcast digital television signal, radiofrequency (RF) communication circuitry configured to select a frequency band from the broadcast digital television signal, and second wireless communication circuitry configured to transmit digital bitstreams received from the RF communication circuitry over a first secure wireless communication connection to the first wireless communication circuitry in the first device, the method comprising:
  receiving, via the processing circuitry in the first device and from a mobile device over a second secure wireless communication connection between the first device and the mobile device, a user selection of broadcast digital television content to be obtained;
  controlling, by the processing circuitry in the first device, the first wireless communication circuitry to transmit a request via the first secure wireless communication connection to the second device to control the RF communication circuitry in the second device to select the frequency band corresponding to the broadcast digital television content from the broadcast digital television signal;
  receive, by the processing circuitry in the first device, encoded broadcast digital content obtained by the RF communication circuitry in the second device via a digital bitstream over the first secure communication connection; and
  decode, the processing circuitry in the first device, the digital bitstream to obtain the broadcast digital television content in response to the user selection.

14. The method of claim 13, wherein the first device further includes:
  a port electrically coupled to the RF communication circuitry, the port configured for connection of the RF antenna.

15. The method of claim 13, wherein the second device is installed under a back window of the vehicle or in a trunk of the vehicle.

16. The method of claim 13, wherein the broadcast digital television signal is an Advanced Television Systems Committee (ATSC) 1.0 signal or an ATSC 3.0 signal.

17. The method of claim 13, wherein the processing circuitry in the first device is configured to:
   transmit the broadcast digital television content to one or more electrical systems of the vehicle through the automotive-specific connector.

18. The method of claim 13, wherein the processing circuitry in the first device is configured to:
   store, at a first time, the broadcast digital television content in memory commutatively coupled to the processing circuitry in response to the user selection;
   receive, at a second time, a request for the broadcast digital television content; and
   transmit the broadcast digital television content in response to the request.

19. The method of claim 13, the processing circuitry in the first device configured to:
   obtain scheduling information indicating defined times at which media content will be encoded in the broadcast digital television signal; and
   determine, based on the scheduling information, a future time at which the broadcast digital television content will be encoded in the broadcast digital television signal, wherein the processing circuitry is configured to control the RF communication circuitry at the future time to select the frequency band.

20. The method of claim 13, wherein wireless communication circuitry communicatively is coupled with the processing circuitry in the first device, the wireless communication circuitry configured to establish a secure wireless communication connection between the wireless communication circuitry and one or more external electronic devices, wherein the user selection is received via the secure wireless communication connection.

* * * * *